United States Patent
Reyes et al.

(10) Patent No.: US 9,670,399 B2
(45) Date of Patent: Jun. 6, 2017

(54) METHODS FOR ACIDIZING A SUBTERRANEAN FORMATION USING A STABILIZED MICROEMULSION CARRIER FLUID

(71) Applicant: Halliburton Energy Services, Inc., Houston, TX (US)

(72) Inventors: Enrique A. Reyes, Houston, TX (US); Alyssa L. Smith, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 238 days.

(21) Appl. No.: 13/836,312

(22) Filed: Mar. 15, 2013

(65) Prior Publication Data

US 2014/0262289 A1 Sep. 18, 2014

(51) Int. Cl.
- *E21B 43/16* (2006.01)
- *C09K 8/72* (2006.01)
- *C09K 8/74* (2006.01)

(52) U.S. Cl.
CPC . *C09K 8/72* (2013.01); *C09K 8/74* (2013.01)

(58) Field of Classification Search
CPC ........ E21B 43/16; E21B 43/26; E21B 43/267; E21B 43/14; E21B 43/25
USPC ................... 166/305.1, 311, 312, 307, 308.2
See application file for complete search history.

(56) References Cited

U.S. PATENT DOCUMENTS

| | | |
|---|---|---|
| 104,950 A | 7/1870 | Fuller |
| 139,298 A | 5/1873 | Danforth et al. |
| 142,166 A | 8/1873 | Kromer |
| 182,761 A | 10/1876 | Kelly |
| 209,108 A | 10/1878 | Brokhahne |
| 3,333,634 A | 8/1967 | Townsend et al. |
| 3,684,720 A | 8/1972 | Richardson |
| 3,889,753 A | 6/1975 | Richardson |
| 4,089,787 A | 5/1978 | Lybarger et al. |
| 4,090,563 A | 5/1978 | Lybarger et al. |
| 4,353,805 A | 10/1982 | Kragen et al. |
| 4,428,432 A | 1/1984 | Pabley |
| 4,540,448 A | 9/1985 | Gautier et al. |
| 4,595,512 A | 6/1986 | Tellier et al. |
| 4,708,207 A | 11/1987 | Kalfayan et al. |
| 5,183,122 A | 2/1993 | Rowbotham et al. |
| 5,207,778 A | 5/1993 | Jennings, Jr. |
| 5,259,980 A | 11/1993 | Morris et al. |
| 5,293,942 A | 3/1994 | Gewanter et al. |
| 5,335,733 A | 8/1994 | Sandiford et al. |
| 5,346,010 A | 9/1994 | Adams et al. |
| 5,481,018 A | 1/1996 | Athey et al. |
| 5,529,125 A | 6/1996 | Di Lullo Arias et al. |
| 5,672,279 A | 9/1997 | Sargent et al. |
| 5,783,524 A | 7/1998 | Greindl et al. |
| 5,786,313 A | 7/1998 | Schneider et al. |
| 5,897,699 A | 4/1999 | Chatterji et al. |
| 5,979,557 A | 11/1999 | Card et al. |
| 6,063,738 A | 5/2000 | Chatterji et al. |
| 6,140,277 A | 10/2000 | Tibbles et al. |
| 6,165,947 A | 12/2000 | Chang et al. |
| 6,263,967 B1 | 7/2001 | Morris et al. |
| 6,315,045 B1 | 11/2001 | Brezinski |
| 6,436,880 B1 | 8/2002 | Frenier |
| 6,525,011 B2 | 2/2003 | Brezinski |
| 6,534,448 B1 | 3/2003 | Brezinski |
| 6,547,871 B2 | 4/2003 | Chatterji et al. |
| 6,549,814 B1 | 4/2003 | Strutz et al. |
| 6,706,668 B2 | 3/2004 | Brezinski |
| 6,746,611 B2 | 6/2004 | Davidson |
| 6,762,154 B2 | 7/2004 | Lungwitz et al. |
| 6,806,236 B2 | 10/2004 | Frenier et al. |
| 6,828,280 B2 | 12/2004 | England et al. |
| 6,881,709 B2 | 4/2005 | Nelson et al. |
| 6,903,054 B2 | 6/2005 | Fu et al. |
| 6,924,253 B2 | 8/2005 | Palmer et al. |
| 6,929,070 B2 | 8/2005 | Fu et al. |
| 6,978,838 B2 | 12/2005 | Parlar et al. |
| 6,984,705 B2 | 1/2006 | Chang et al. |
| 6,987,083 B2 | 1/2006 | Phillippi et al. |
| 7,028,775 B2 | 4/2006 | Fu et al. |

(Continued)

FOREIGN PATENT DOCUMENTS

| | | |
|---|---|---|
| EP | 0073599 A1 | 3/1983 |
| EP | 0976911 A1 | 2/2000 |

(Continued)

OTHER PUBLICATIONS

International Search Report and Written Opinion for PCT/US2014/023428 dated Jul. 11, 2014.
"Scale," Sintef Petroleum Research, www.sintef.com, 2006.
AATCC Test Method 149-2002, Sep. 27, 2006.
Advanced Corrosion and Scale Management in Oil and Gas, 2006.
Aker Well Services, 2007.
AkzoNobel in the Oilfield Industry, 2008.
BASF, Performance Chemicals, not dated.
BASF, Technical Bulletin, Trilon M Types, May 2007.
Chem. Rev. 2007, Designing Small Molecules for Biodegradability; Boethling, R.S.; Sommer, E.; DiFiore, D., pp. 2207-2227.

(Continued)

*Primary Examiner* — Silvana Runyan
(74) *Attorney, Agent, or Firm* — McDermott Will & Emery LLP; Craig Roddy (57) ABSTRACT

Acidizing fluids may be formulated to minimize the detrimental effects of precipitation during an acidizing operation by promoting production of precipitates from a subterranean formation. Methods for acidizing a subterranean formation can comprise: providing an acidizing fluid comprising a stabilized microemulsion carrier fluid, a chelating agent, and an acid source; introducing the acidizing fluid into a subterranean formation; at least partially dissolving a surface in the subterranean formation with the acidizing fluid, thereby forming a spent fluid; and producing the spent fluid from the subterranean formation.

21 Claims, 2 Drawing Sheets

(56) References Cited

U.S. PATENT DOCUMENTS

| | | | |
|---|---|---|---|
| 7,036,585 B2 | 5/2006 | Zhou et al. |
| 7,052,901 B2 | 5/2006 | Crews |
| 7,059,414 B2 | 6/2006 | Rae et al. |
| 7,069,994 B2 | 7/2006 | Cooke, Jr. |
| 7,114,567 B2 | 10/2006 | Chan et al. |
| 7,159,659 B2 | 1/2007 | Welton et al. |
| 7,192,908 B2 | 3/2007 | Frenier et al. |
| 7,208,529 B2 | 4/2007 | Crews |
| 7,228,904 B2 | 6/2007 | Todd et al. |
| 7,261,160 B2 | 8/2007 | Welton et al. |
| 7,299,874 B2 | 11/2007 | Welton et al. |
| 7,303,012 B2 | 12/2007 | Chan et al. |
| 7,303,019 B2 | 12/2007 | Welton et al. |
| 7,306,041 B2 | 12/2007 | Milne et al. |
| 7,380,602 B2 | 6/2008 | Brady et al. |
| 7,380,606 B2 | 6/2008 | Pursley et al. |
| 7,427,584 B2 | 9/2008 | Frenier et al. |
| 7,589,050 B2 | 9/2009 | Frenier et al. |
| 7,655,603 B2 | 2/2010 | Crews |
| 7,687,439 B2 | 3/2010 | Jones et al. |
| 7,753,123 B2 | 7/2010 | Fuller |
| 7,947,633 B2 | 5/2011 | Knox |
| 8,043,996 B2 * | 10/2011 | Harris | 507/90 |
| 8,071,511 B2 | 12/2011 | Welton et al. |
| 8,312,929 B2 | 11/2012 | Frenier et al. |
| 8,357,639 B2 | 1/2013 | Quintero et al. |
| 2002/0070022 A1 | 6/2002 | Chang et al. |
| 2002/0076803 A1 | 6/2002 | Crews |
| 2003/0054962 A1 | 3/2003 | England et al. |
| 2003/0104950 A1 | 6/2003 | Frenier et al. |
| 2003/0139298 A1 | 7/2003 | Fu et al. |
| 2003/0166472 A1 | 9/2003 | Pursley et al. |
| 2004/0009880 A1 | 1/2004 | Fu |
| 2004/0011527 A1 | 1/2004 | Jones et al. |
| 2004/0176478 A1 | 9/2004 | Dahayanake et al. |
| 2004/0177960 A1 | 9/2004 | Chan et al. |
| 2004/0235677 A1 | 11/2004 | Nguyen et al. |
| 2004/0254079 A1 | 12/2004 | Frenier et al. |
| 2005/0124525 A1 | 6/2005 | Hartshorne et al. |
| 2005/0126781 A1 | 6/2005 | Reddy et al. |
| 2005/0209108 A1 | 9/2005 | Fu et al. |
| 2005/0233911 A1 | 10/2005 | Samuel |
| 2006/0013798 A1 | 1/2006 | Henry et al. |
| 2006/0014648 A1 | 1/2006 | Milson et al. |
| 2006/0025321 A1 | 2/2006 | Treybig et al. |
| 2006/0041028 A1 | 2/2006 | Crews |
| 2006/0054325 A1 | 3/2006 | Brown et al. |
| 2006/0073986 A1 * | 4/2006 | Jones | C09K 8/36 507/129 |
| 2006/0131022 A1 | 6/2006 | Rae et al. |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0258541 A1 | 11/2006 | Crews |
| 2007/0060482 A1 | 3/2007 | Welton et al. |
| 2007/0111896 A1 * | 5/2007 | Knox et al. | 507/209 |
| 2007/0158067 A1 | 7/2007 | Xiao et al. |
| 2007/0213233 A1 | 9/2007 | Freeman et al. |
| 2007/0281868 A1 | 12/2007 | Pauls et al. |
| 2008/0035339 A1 | 2/2008 | Welton et al. |
| 2008/0035340 A1 | 2/2008 | Welton et al. |
| 2008/0039347 A1 | 2/2008 | Welton et al. |
| 2008/0110618 A1 * | 5/2008 | Quintero et al. | 166/278 |
| 2008/0190609 A1 | 8/2008 | Robb et al. |
| 2008/0194427 A1 | 8/2008 | Welton et al. |
| 2008/0194428 A1 | 8/2008 | Welton et al. |
| 2008/0194430 A1 | 8/2008 | Welton et al. |
| 2008/0200354 A1 | 8/2008 | Jones et al. |
| 2008/0287324 A1 | 11/2008 | Pursley et al. |
| 2009/0042748 A1 | 2/2009 | Fuller |
| 2009/0042750 A1 | 2/2009 | Pauls et al. |
| 2009/0192054 A1 | 7/2009 | Frenier et al. |
| 2009/0192057 A1 | 7/2009 | Frenier et al. |
| 2009/0264325 A1 | 10/2009 | Atkins et al. |
| 2009/0291863 A1 | 11/2009 | Welton et al. |
| 2010/0137168 A1 | 6/2010 | Quintero et al. |
| 2010/0152069 A1 * | 6/2010 | Harris | C09K 8/524 507/201 |
| 2010/0160189 A1 * | 6/2010 | Fuller et al. | 507/241 |
| 2010/0212896 A1 | 8/2010 | Navarro et al. |
| 2010/0276152 A1 * | 11/2010 | De Wolf et al. | 166/308.2 |
| 2010/0311620 A1 | 12/2010 | Knox |
| 2011/0028358 A1 | 2/2011 | Welton et al. |
| 2011/0053811 A1 | 3/2011 | Horton et al. |
| 2011/0059873 A1 | 3/2011 | Weerasooriya et al. |
| 2011/0061870 A1 | 3/2011 | Navarro-mascarell et al. |
| 2011/0214874 A1 | 9/2011 | Dakin et al. |
| 2011/0259592 A1 | 10/2011 | Reyes |
| 2011/0290482 A1 | 12/2011 | Weerasooriya et al. |
| 2012/0067576 A1 | 3/2012 | Reyes et al. |
| 2012/0097392 A1 | 4/2012 | Reyes et al. |
| 2012/0115759 A1 | 5/2012 | Reyes |
| 2012/0145401 A1 | 6/2012 | Reyes |
| 2012/0181033 A1 | 7/2012 | Saini et al. |
| 2012/0202720 A1 | 8/2012 | de Wolf et al. |
| 2012/0260938 A1 | 10/2012 | Zack et al. |
| 2013/0025870 A1 | 1/2013 | Berry et al. |
| 2013/0281329 A1 * | 10/2013 | De Wolf et al. | 507/241 |
| 2014/0096969 A1 * | 4/2014 | Ali | C09K 8/68 166/308.1 |

FOREIGN PATENT DOCUMENTS

| | | | |
|---|---|---|---|
| EP | 1004571 A1 | 5/2000 |
| EP | 1188772 A2 | 3/2002 |
| EP | 1242556 A1 | 9/2002 |
| EP | 1520085 A1 | 4/2005 |
| EP | 1817391 A2 | 8/2007 |
| EP | 2371923 A1 | 10/2011 |
| WO | 9640625 A1 | 12/1996 |
| WO | 0142387 A1 | 6/2001 |
| WO | 2004/005671 A1 | 1/2004 |
| WO | 2004/090282 A1 | 10/2004 |
| WO | 2005/121273 A1 | 12/2005 |
| WO | 2006/054261 A2 | 5/2006 |
| WO | 2007/022307 A2 | 2/2007 |
| WO | 2009/002078 A2 | 12/2008 |
| WO | 2009/091652 A2 | 7/2009 |
| WO | 2009/137399 A2 | 11/2009 |
| WO | 2010/053904 A2 | 5/2010 |
| WO | 2012/000915 A1 | 1/2012 |
| WO | 2012/080296 A1 | 6/2012 |
| WO | 2012/080297 A1 | 6/2012 |
| WO | 2012/080298 A1 | 6/2012 |
| WO | 2012/080299 A1 | 6/2012 |
| WO | 2012/080463 A1 | 6/2012 |
| WO | 2012/113738 A1 | 8/2012 |
| WO | 2012/171858 A1 | 12/2012 |
| WO | 2013/015870 A1 | 1/2013 |
| WO | 2013115981 A1 | 8/2013 |
| WO | 2014150499 A1 | 9/2014 |

OTHER PUBLICATIONS

Chemical Speciation of EDDS and its metal complexes in solution, 1999.

Chemical Stimulation in Near Wellbore Geothermal Formations, Jan. 2007.

Chemosphere vol. 34 No. 4, Biodegradation and Aquatic Toxicity of ADA, 1997.

Environ. Sci. Tech. 2002, Environmental Chemistry of Aminopolycarboxylate Chelating Agents; Bernd Nowack; 36(19), 4009-4016.

Environ Sct Technol, Extraction of Heavy Metals from Soils Using Biodegradable Chelating Agents, 2004.

Fighting Scale—Removal and Prevention, 1999.

Halliburton Top Technology Solutions 2006.

Integrated Risk Analysis for Scale Management in Deepwater Developments, 2005.

IPTC 14932, Challenges During Shallow and Deep Carbonate Reservoirs Stimulation, 2011.

Mahmoud Thesis, TAMU, 2011.

(56) References Cited

OTHER PUBLICATIONS

Rohit Mittal Thesis, TAMU.
Schlumberger Oilfield Glossary for Scale, 2007.
Simultaneous Gravel Packing and Filter-Cake Cleanup with Shunt Tubes, 2002.
Six Steps to Successful Sandstone Acidizing, 2008.
SPE 7565, The Development and Application of a High pH Acid Stimulation System for a Deep Mississippi Gas Well, 1978.
SPE 30419, Alternate acid blends for HPHT applications, 1995.
SPE 31076, Kinetics of Tertiary Reaction of HF on Alumino-Silicates, 1996.
SPE 36907, Improved Success in Acid Stimulations with a New Organic-HF System, 1996.
SPE 63242, Use of Highly Acid Soluble Chelating agents in Well Stimulation Services, 2000.
SPE 80597, A biodegradable chelating agent is developed for stimulation of oil and gas formations, 2003.
SPE 88597, Inhibitor Squeeze Design and Returns Monitoring to Manage Downhole Scale Problem, 2004.
SPE 121464, The optimum injection rate for wormhole propagation: myth or reality? 2009.
SPE 121709, LePage XP09160538, An Environmentally Friendly Stimulation Fluid for High-Temperature Applications, Mar. 2011.
SPE 121803, Wormhole formation in carbonates under varying temperature conditions, 2009.
SPE 127923, Evaluation of a New Environmentally Friendly Chelating Agent for High-Temperature Applications, 2011.
SPE 128091, Impact of Organic Acids/Chelating Agents on the Rheological Properties of an Amidoamine-Oxide Surfactant, 2011.
SPE 131626, An Effective Stimulation Fluid for Deep Carbonate Reservoirs: A Core Flood Study, Jun. 2010.
SPE 132286, Stimulation of Carbonate Reservoirs Using GLDA (Chelating Agent) Solutions, Jun. 2010.
SPE 133497, Optimum Injection Rate of a New Chelate That Can Be Used to Stimulate Carbonate Reservoirs, 2010.
SPE 139815, Sandstone Acidizing Using a New Class of Chelating Agents, 2011.
SPE 139816, Reaction of GLDA with Calcite: Reaction Kinetics and Transport Study, 2011.
SPE 140816, A Biodegradable Chelating Agent Designed to be an Environmentally Friendly Filter-cake Breaker, 2011.
SPE 141410, Scale formation prevention during ASP flooding, 2011.
SPE 143086, Effect of Reservoir Fluid Type on the Stimulation of Carbonate Reservoirs Using Chelating Agents, 2011.
SPE 143301, Novel Environmentally Friendly Fluids to Remove Carbonate Minerals from Deep Sandstone Formations, 2011.
SPE 147395, Removing Formation Damage and Stimulation of Deep Illitic-Sandstone Reservoirs Using Green Fluids, 2011.
SPE 149127, When Should We Use Chelating Agents in Carbonate Stimulation?, 2011.
SPE 152716, A New, Low Corrosive Fluid to Stimulate Deep Wells Completed With Cr-based Alloys, 2012.

SPE 157467, Improved Health, Safety and Environmental Profile of a New Field Proven Stimulation Fluid, 2012.
SPE Production and Facilities, 2004, Hot oil and gas wells can be stimulated without acid.
SPE Production and Facilities, 2004, Organic Acids in Carbonate Acidizing.
STD 1092, Methyl glycine diacetic acid trisodium salt, 2004.
Technical Information Paper XP-002457846.
Removal of Filter Cake Generated by Manganese Tetraoxide Water-Based Drilling Fluids, Abdullah Mohammed A. Al Mojil, Texas A&M, Aug. 2010.
Removing of Formation Damage and Enhancement of Formation Productivity Using Environmentally Friendly Chemicals, Mohammed Ahmed Nasr Eldin Mahmoud, Texas A&M, May 2011.
International Search Report and Written Opinion for PCT/US2013/021562 dated May 24, 2013.
Dean et al., "Evaluation of 4-Hydroxy-6-Methyl-3-Pyridinecarboxylic Acid and 2,6-Dimethyl-4-Hydroxy-3-Pyridinecarboxylic Acid as Chelating Agents for Iron and Aluminum," Inorganica Chimica Acta 373 (2011), 179-186.
Chaves et al., "Alkylaryl-Amino Derivatives of 3-Hydroxy-4-Pyridinones as Aluminum Chelating Agents with Potential Clinical Application," Journal of Inorganic Biochemistry 97 (2003), 161-172.
Sija et al., "Interactions of Pyridinecarboxylic Acid Chelators with Brain Metail Ions: Cu(II), Zn(II), and Al(III)," Monatsh Chem (2011), 142:399-410.
Walther, John V., "Relation Between Rates of Aluminosilicate Mineral Dissolution, pH, Temperature, and Surface Charge," American Journal of Science, vol. 296, Summer, 1996, p. 693-728.
Clark et al., "Mixing and Aluminum Precipitation," Environ. Sci. Technol. 1993, 27, 2181-2189.
Duckworth et al., "Quantitative Structure—Activity Relationships for Aqueous Metal-Siderophore Complexes," Environ. Sci. Technol. 2009, 43, 343-349.
Fein et al., "Experimental Stud of Aluminum and Calcium Malonate Complexation at 25, 35, and 80° C.," Geochimica et Cosmochimica Acta, vol. 59, No. 6, pp. 1053-1062, 1995.
Moeller et al., "The Stabilities and Thermodynamic Functions for the Formation of Aluminium and Mercury (II) Chelates of Certain Polyaminepolyacetic Acids," J. Inorg. Nucl. Chem., 1966, vol. 28, pp. 153 to 159.
Kruck et al., "Synthesis of Feralex a Novel Aluminum/Iron Chelating Compound," Journal of Inorganic Biochemistry 88 (2002), 19-24.
Feng et al., "Aluminum Citrate: Isolationa nd Structural Characterization of a Stable Trinudear Complex," Inorg, Chem. 1990, 29, 408-411.
Kalfayan, Leonard, "Production Enhancement with Acid Stimulation," PennWell Corporation, 2000.
Kalfayan, Leonard, "Production Enhancement with Acid Stimulation," 2nd ed., PennWell Corporation, 2008.

* cited by examiner

METHODS FOR ACIDIZING A SUBTERRANEAN FORMATION USING A STABILIZED MICROEMULSION CARRIER FLUID

BACKGROUND

The present disclosure generally relates to acidizing a subterranean formation, and, more specifically, to acidizing fluids that may minimize the severity of precipitation during an acidizing process.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. Illustrative treatment operations can include, for example, drilling operations, fracturing operations, gravel packing operations, acidizing operations, scale dissolution and removal operations, sand control operations, consolidation operations, and the like.

Acidizing operations can be used to stimulate a subterranean formation to increase production therefrom. During an acidizing operation, an acid-soluble material in the subterranean formation can be dissolved by one or more acids to expand existing flow pathways in the subterranean formation, to create new flow pathways in the subterranean formation, or to remove acid-soluble precipitation damage in the subterranean formation. The acid-soluble material being dissolved by the acid(s) can be part of the native formation matrix or can have been deliberately introduced into the subterranean formation in conjunction with a stimulation or like treatment operation (e.g., proppant or gravel particulates). Illustrative substances within the native formation matrix that may be dissolved by an acid include, but are not limited to, carbonates, silicates and aluminosilicates. Other substances can also be dissolved during the course of performing an acidizing operation, and the foregoing substances should not be considered to limit the scope of substances that may undergo acidization. As further discussed below, certain components dissolved during an acidizing operation can be problematic and possibly detrimental for future production from the subterranean formation.

Carbonate formations can contain minerals that comprise a carbonate anion (e.g., calcite and dolomite). When acidizing a carbonate formation, the acidity of the treatment fluid alone can be sufficient to solubilize the carbonate material. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. As used herein, the term "siliceous" refers to a substance having the characteristics of silica, including silicates and/or aluminosilicates. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). Acidizing a siliceous formation or a formation containing a siliceous material is thought to be considerably different than acidizing a carbonate formation. Specifically, the mineral and organic acids that can be effective for acidizing a carbonate formation may have little effect on a siliceous formation, since these acids do not effectively react with siliceous materials to affect their dissolution. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during dissolution of a siliceous material. The low pH state may promote initial silicon or aluminum dissolution and aid in maintaining these substances in a dissolved state.

Despite the advantages that can be realized by acidizing a siliceous formation, silicon and aluminum can sometimes further react to produce damaging precipitates after their dissolution that can often be more detrimental for production than if the acidizing operation had not been performed in the first place. The equilibrium solubility levels of silicon and aluminum in a fluid usually depend upon one another. That is, by maintaining high levels of dissolved aluminum during an acidizing operation, silicon dissolution can also be promoted. In this regard, dissolved aluminum can be maintained in a fluid by coordination with fluoride ions, but such aluminum coordination can leave insufficient fluoride ions remaining for effective silicon solubilization to take place, thereby leading to damaging silicon precipitation. Chelating agents can be used to increase the degree of silicon solubilization by maintaining aluminum in a dissolved state. By chelating aluminum to form a soluble aluminum complex, increased levels of dissolved silicon may be realized, since more free fluoride ions are left available to affect its solubilization.

Even when chelating agents are used during an acidizing operation, precipitation can still be problematic. If the amount of aluminum or another metal needing sequestration exceeds the amount of chelating agent that is available, precipitation can still occur. An even more significant issue is that of precipitation of insoluble fluorosilicates and aluminosilicates that can occur in the presence of Group 1 metal ions (i.e., alkali metal ions). The terms "Group 1 metal ions" and "alkali metal ions" will be used synonymously herein. Under low pH conditions (e.g., below a pH of about 3), dissolved silicon can react with Group 1 metal ions (e.g., $Na^+$ and $K^+$) to produce insoluble alkali metal fluorosilicates and aluminosilicates. Other metal ions, including Group 2 metal ions (e.g., $Ca^{2+}$ and $Mg^{2+}$), may also be problematic in this regard. In many instances, pre-flush fluids may be introduced to a subterranean formation prior to performing an acidizing operation in order to decrease the quantity of available alkali metal ions. In some instances, such pre-flush fluids can contain ammonium ions ($NH_4^+$) that can displace alkali metal ions in the subterranean formation and leave it desirably conditioned for an acidizating operation. In contrast to alkali metal ions, ammonium ions are not believed to promote the formation of insoluble fluorosilicates and aluminosilicates. The use of pre-flush fluids, particularly those containing ammonium ions, can considerably add to the time and expense needed to perform an acidizing operation. In addition to problematic alkali metal ions in the subterranean formation itself, the precipitation of alkali metal fluorosilicates and fluoroaluminates can considerably limit the sourcing of carrier fluids that may be used when acidizing a subterranean formation.

Other techniques can also be applied for mitigating precipitation during an acidizing operation. Without limitation, these additional techniques can include adding agents to a subterranean formation that directly complex silicon or that increase the fluid solubility of highly insoluble substances. Despite the various approaches that can be used for mitigating precipitation during an acidizing operation, precipitation represents a complex problem that can arise from a number of different sources. As a result, precipitation can be a near-inevitable problem that must be addressed in some manner during the course of conducting a downhole operation.

SUMMARY OF THE INVENTION

The present disclosure generally relates to acidizing a subterranean formation, and, more specifically, to acidizing fluids that may minimize the severity of precipitation during an acidizing process.

In some embodiments, the present invention provides methods comprising: providing an acidizing fluid comprising a stabilized microemulsion carrier fluid, a chelating agent, and an acid source; introducing the acidizing fluid into a subterranean formation; at least partially dissolving a surface in the subterranean formation with the acidizing fluid, thereby forming a spent fluid; and producing the spent fluid from the subterranean formation.

In some embodiments, the present invention provides methods comprising: providing an acidizing fluid comprising a stabilized microemulsion carrier fluid, a chelating agent, and a hydrofluoric acid source; introducing the acidizing fluid into a subterranean formation containing a siliceous material; and at least partially dissolving the siliceous material in the subterranean formation with the acidizing fluid, thereby forming a spent fluid.

In some embodiments, the present invention provides methods comprising: introducing a stabilized microemulsion carrier fluid, a chelating agent, and a hydrofluoric acid source to a subterranean formation comprising a siliceous material; at least partially dissolving the siliceous material in the subterranean formation with the hydrofluoric acid source; and complexing a metal ion in the subterranean formation with the chelating agent.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to acidizing a subterranean formation, and, more specifically, to acidizing fluids that may minimize the severity of precipitation during an acidizing process.

Despite the various precautions that may be undertaken to reduce the incidence or severity of precipitation during an acidizing operation, at least some precipitation inevitably occurs. If the quantity and/or size of the precipitates can be kept sufficiently small, however, they may not be overly damaging to the subterranean formation. Small quantities of precipitates may not appreciably impact the permeability of a subterranean formation by blocking flow pathways therein. Precipitates that are small in size may remain fluidly mobile such that they can be conveyed by a fluid and produced from the subterranean formation. By formulating an acidizing fluid to better transport precipitates that do form during an acidizing operation, the acidizing operation may be made to be more tolerant toward precipitation. By making an acidizing fluid more tolerant toward precipitate occurrence, there may be a reduced need to formulate the acidizing fluid to contain additional measures that minimize the occurrence of precipitates, thereby potentially lowering the cost of conducting an acidizing operation.

In order to increase the tolerance of acidizing fluids toward precipitation, the acidizing fluids described herein comprise a stabilized microemulsion carrier fluid. As used herein, the term "stabilized microemulsion" refers to a composition containing a continuous fluid phase and a discontinuous phase of emulsion particulates in the continuous fluid phase, where the emulsion particulates are about 10 microns or smaller in size. The term "stabilized" refers to the feature that the microemulsion does not break into two or more immiscible continuous fluid phases on its own. Stabilized microemulsions also encompass stabilized nanoemulsions, which have emulsion particulates that are about 100 nm or smaller in size. As used herein, the terms "stabilized microemulsion" and "stabilized nanoemulsion" may be used interchangeably with the terms "complex microfluid" or "complex nanofluid." It is to be recognized that any embodiment described herein in reference to a stabilized microemulsion may be practiced in a like manner with a stabilized nanoemulsion.

Stabilized microemulsions may be particularly advantageous for mitigating the effects of precipitation during an acidizing operation. As a carrier fluid, stabilized microemulsions may possess good fluidity and therefore a ready ability to flow through the porosity of a subterranean formation. The good flow characteristics of stabilized microemulsions contrast those of emulsions having larger particulate sizes, which can exhibit significant viscosity and/or gelation and sometimes only flow with difficulty. By maintaining good flow characteristics, acidizing fluids formulated with a stabilized microemulsion carrier fluid may readily migrate through the flow pathways in low permeability subterranean formations, including shale formations, thereby wetting the surface of the subterranean formation. The enhanced wetting of the subterranean formation may improve the effectiveness of the acidizing fluid upon the surface of the subterranean formation. Moreover, the stabilized microemulsion can provide good wetting to the surface of any precipitates that may form during the course of an acidizing operation. Surface wetting of the precipitates may be particularly desirable to facilitate their suspension in the stabilized microemulsion carrier fluid. By facilitating suspension of the precipitates in the stabilized microemulsion carrier fluid, the precipitates may be produced from the subterranean formation as the stabilized microemulsion carrier fluid is flowed back to the earth's surface.

Not only do stabilized microemulsion carrier fluids promote the production of precipitates from a subterranean formation, but also the microemulsion structure may allow larger precipitates to be supported and transported in the microemulsion carrier fluid than would otherwise be possible without the emulsion particulates being present. Moreover, as a further advantage, the presence of a stabilized microemulsion during precipitate formation may promote the formation of smaller precipitates than would otherwise be formed in its absence. Still further, stabilized microemulsion may also reduce the rate of precipitation in a subterranean formation once precipitation begins.

As discussed above, chelating agents can be used in conjunction with an acidizing operation to lessen the occurrence of damaging precipitates in a subterranean formation. Chelating agents and other substances used to address downhole precipitation can readily be employed in conjunction with a stabilized microemulsion carrier fluid, thereby targeting the downhole precipitation from competing mechanistic pathways. By using a microemulsion carrier fluid in combination with one or more other agents that suppress precipitation, the amount of precipitation can be kept sufficiently low for suspension of the precipitates in the microemulsion carrier fluid and production from the subterranean formation. By addressing precipitation via competing mechanistic pathways, it may be possible to acidize a subterranean surface more vigorously with less fear of formation damage taking place, thereby reducing the time and expense needed to conduct the acidizing operation. Moreover, by employing a stabilized microemulsion carrier fluid, there may be an increased tolerance for alkali metal ions in the subterranean formation, which may also decrease the time and expense of performing the acidizing operation by reducing the need for pre-flush treatment cycles.

As an additional advantage of the acidizing fluids described herein, some stabilized microemulsions can be formed from naturally occurring materials, including those that are biodegradable. Biodegradability represents a significant advantage for the downhole use of stabilized microemulsions and related materials. For example, in some embodiments, a biodegradable chelating agent can be used in conjunction with a biodegradable stabilized microemulsion in order to provide an acidizing fluid with a highly desirable environmental profile.

As used herein, the term "acid source" will refer to an acid or an acid-generating compound.

As used herein, the term "spent fluid" will refer to an acidizing fluid in which an acid source therein has been at least partially consumed.

As used herein, the term "siliceous material" refers to a substance having the characteristics of silica, including silicates and/or aluminosilicates.

As used herein, the term "precipitate" refers to a solid substance formed in the course of reacting a substance in a subterranean formation with an acidizing fluid.

In some embodiments, methods described herein can comprise: providing an acidizing fluid comprising a stabilized microemulsion carrier fluid, a chelating agent, and an acid source; introducing the acidizing fluid into a subterranean formation; at least partially dissolving a surface in the subterranean formation with the acidizing fluid, thereby forming a spent fluid; and producing the spent fluid from the subterranean formation. In some embodiments, a precipitate may be formed in the course of at least partially dissolving a surface in the subterranean formation. In some embodiments, the methods may further comprise producing the precipitate from the subterranean formation with the spent fluid.

The identity of the stabilized microemulsion carrier fluid used in the acidizing fluids described herein is not believed to be particularly limited. Illustrative examples of stabilized microemulsions may be found in U.S. Pat. Nos. 7,380,606 and 8,357,639 and United States Patent Application Publication 2008/0287324 (now abandoned), each of which is incorporated herein by reference in its entirety. Generally, the stabilized microemulsions contain one or more surfactants, an alcohol, and a continuous phase comprising one or more solvents. The continuous phase may be an aqueous phase or an organic phase, and the stabilized microemulsions may be water-in-oil microemulsions or oil-in-water microemulsions. For acidizing operations conducted with aqueous acidizing fluids, the latter may be preferred. One particularly suitable stabilized microemulsion may be GAS-PERM 1000® fluid additive, which is available from Halliburton Energy Services. Other suitable stabilized microemulsions may be available from Flotek. Another suitable stabilized microemulsion is LOSURF 360 surfactant, which is available from Halliburton Energy Services, Inc. The stabilized microemulsions may be added to a carrier fluid, such as an aqueous carrier fluid, that is of a non-emulsified nature.

Illustrative solvents that may be present in the continuous phase of the microemulsions include, for example, terpenes (including monoterpenes and diterpenes); alkyl, cyclic or aryl acid esters of short chain alcohols (e.g., ethyl lactate), water, brine, unsaturated salt solutions, diesel, kerosene, esters, linear α-olefins, poly α-olefins, internal olefins, linear alkyl benzenes, and the like. One example of a terpene that may be particularly desirable is d-limonene, which has good dissolution properties and is biodegradable. Ethyl lactate also possesses good biodegradation properties. Other suitable solvents can be envisioned by one having ordinary skill in the art.

For oil-in-water microemulsions, suitable surfactants may include, for example, polyoxyethylene sorbitan monopalmitate, polyoxyethylene sorbitan monostearate, polyoxyethylene sorbitan monooleate, linear alcohol alkoxylates, alkyl ether sulfates, dodecylbenzenesulfonic acid, linear nonylphenols, dioxane, ethoxylated castor oil, dipalmitoylphosphatidylcholine, polyoxyethylene nonyl-phenol ether, sodium bis-2-ethylhexylsulfosuccinate, tetraethyleneglycoldodecylether, sodium octylbenzenesulfonate, alkyl propoxy-ethoxysulfonates, alkyl propoxy-ethoxysulfates, alkylarylpropoxy-ethoxysulfonates, benzenesulfonates, and derivatives thereof. Other surfactants suitable for use in oil-in-water microemulsions can be envisioned by one having ordinary skill in the art.

For water-in-oil microemulsions, suitable surfactants may include, for example, sorbitan monopalmitate, sorbitan monostearate, and sorbitan monooleate. Mixtures of the foregoing with the surfactants used in oil-in-water emulsions may also be used. Other surfactants suitable for use in water-in-oil microemulsions can be envisioned by one having ordinary skill in the art.

Other suitable surfactants that may be present in the microemulsions may include, for example, alkyl sulfates, alkyl ether sulfonates, alkyl sulfonates, alkylaryl sulfonates, linear and branched alkyl ether sulfates and sulfonates, polypropoxylated sulfates and sulfonates, polyethoxylated sulfates and sulfonates, alkyl disulfonates, alkylaryl disulfonates, alkyl disulfates, alkyl sulfosuccinates, alkyl ether sulfates, carboxylates, fatty acid carboxylates, phosphate esters, amides, diamides, polyglycol esters, alkyl polyglycosides, sorbitan esters, methyl glucoside esters, alcohol ethoxylates, arginine methyl esters, alkanolamines, and alkylenediamines.

Without being bound by any theory of mechanism, it is believed that the alcohol component of the stabilized microemulsions may serve as a coupling agent between the solvent and the surfactant and thereby stabilize the microemulsion. Illustrative alcohols that may be present in the stabilized microemulsion can include $C_1$-$C_{20}$ alcohols such as, for example, methanol, ethanol, propanol, isopropanol, n-butanol, isobutanol, t-butanol, n-pentanol, n-hexanol, and the like. Other suitable alcohols can include glycols such as ethylene glycol, polyethyleneglycol, propylene glycol, and triethylene glycol. It is to be recognized that in some embodiments, a stabilized microemulsion may be formed without an alcohol being present.

The type of subterranean formation being treated with the acidizing fluids described herein is not believed to be particularly limited. In some embodiments, the subterranean formation may comprise a carbonate formation, such as a limestone or dolomite formation, for example. Particularly in embodiments where the acidizing fluid comprises hydrofluoric acid or a hydrofluoric acid-generating compound, the subterranean formation may comprise a siliceous formation or have had a siliceous material introduced thereto. In some embodiments, the subterranean formation may comprise a sandstone formation or a clay-containing formation. In some embodiments, the subterranean formation may comprise a subterranean formation having a low permeability, such as a shale formation, for example. In some or other embodiments, the subterranean formation may comprise native minerals such as, for example, authigenic or detrital minerals, particularly layered aluminosilicates, feldspathic minerals, or purely siliceous minerals.

In addition to subterranean formations that natively contain the above minerals, in some embodiments, the subterranean formation may have had any of the above minerals introduced thereto. For example, in some embodiments, proppant or gravel particulates that comprise a potentially problematic mineral can be introduced to a subterranean formation and subsequently be treated therein. That is, in some embodiments, the acidizing fluids described herein may be used for treating a proppant pack or a gravel pack in a subterranean formation.

In more particular embodiments, the subterranean formation may comprise an aluminosilicate material, which can be natively present in the subterranean formation or have been introduced thereto. Aluminosilicate materials that may be present in a siliceous subterranean formation include clays (including mixed layer and swelling clays), zeolites, kaolinite, illite, chlorite, bentonite, and feldspars, for example. It is to be recognized that, in some embodiments, a siliceous subterranean formation may comprise other materials that are non-siliceous in nature. For example, in some embodiments, a siliceous subterranean formation or a siliceous material in another type of subterranean formation may comprise about 1% to about 35% of a carbonate material by mass. In some embodiments, the subterranean formation can comprise a matrix that is substantially non-siliceous in nature but contains a siliceous material therein (e.g., introduced proppant or gravel particulates or siliceous particulates within a carbonate formation matrix).

In some embodiments, acidizing fluids described herein can have a pH ranging between about 0 and about 7, or between about 0 and about 2, or between about 1 and about 2, or between about 1 and about 3, or between about 1 and about 4, or between about 1 and about 5, or between about 1 and about 6, or between about 1 and about 7. Such pH values may be especially advantageous for promoting dissolution of silicates and aluminosilicates at a desirable rate, as well as maintaining silicon in a dissolved state once dissolution occurs. The low pH values can discourage the formation of precipitates in the subterranean formation.

In some embodiments, the acidizing fluids described herein may include an acid or an acid-generating compound. The acid or acid-generating compound may be a mineral acid or an organic acid. Suitable mineral acids may include, for example, hydrochloric acid, hydrofluoric acid and the like. Suitable organic acids may include, for example, formic acid, acetic acid, chloroacetic acid, dichloroacetic acid, trichloroacetic acid, methanesulfonic acid and the like. In some embodiments, hydrofluoric acid may be present in the acidizing fluids described herein in combination with an acid-generating compound or another acid, such as hydrochloric acid or an organic acid, for example. Use of hydrofluoric acid in combination with another acid or an acid-generating compound may help maintain the pH of the acidizing fluid in a desired range as the hydrofluoric acid of the acidizing fluid becomes spent. For example, the acid or acid-generating compound may be present in the acidizing fluid in a quantity sufficient to maintain the pH of the acidizing fluid within the ranges set forth above. In other embodiments, however, hydrofluoric acid may be the only acid present, other than an acid comprising the chelating agent.

Examples of suitable acid-generating compounds may include, for example, esters, aliphatic polyesters, orthoesters, poly(orthoesters), poly(lactides), poly(glycolides), poly($\epsilon$-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

In some embodiments, the acidizing fluids described herein may comprise hydrofluoric acid or a hydrofluoric acid generating compound. Examples of suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

When used, a hydrofluoric acid-generating compound can be present in the acidizing fluids described herein in an amount ranging between about 0.1% to about 20% of the acidizing fluid by weight. In other embodiments, an amount of the hydrofluoric acid-generating compound can range between about 0.5% to about 10% of the acidizing fluid by weight or between about 0.5% to about 8% of the acidizing fluid by weight. Hydrofluoric acid may be used in the acidizing fluids in similar concentration ranges.

In various embodiments, the acidizing fluids described herein may comprise a chelating agent, and the methods described herein may further comprise complexing a metal ion in the subterranean formation with the chelating agent. The metal ion may be produced by the reaction of a surface in the subterranean formation with an acid, or the chelating agent may react directly with the surface to affect dissolution. As described above, inclusion of a chelating agent in the acidizing fluid and complexation of a metal ion therewith may be desirable to discourage precipitation in a subterranean formation such that the stabilized microemulsion carrier fluid can better protect the subterranean formation from precipitates that do form.

In some embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in the acidizing fluids described herein.

In some or other embodiments, a biodegradable chelating agent may be included in the acidizing fluids described herein. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. Suitable biodegradable chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediannine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. In some embodiments, a biodegradable chelating agent may be used in combination with a biodegradable stabilized microemulsion carrier fluid, thereby improving the overall environmental profile of the acidizing fluids.

In some embodiments, the concentration of the chelating agent in the acidizing fluid may range between about 0.1% to about 50% of the acidizing fluid by weight, or between about 0.1% to about 5% of the acidizing fluid by weight, or between about 1% to about 10% of the acidizing fluid by weight, or between about 5% to about 15% of the acidizing fluid by weight, or between about 0.5% to about 5% of the acidizing fluid by weight, or between about 10% to about 25% of the acidizing fluid by weight, or between about 5% to about 50% of the acidizing fluid by weight.

In some embodiments, methods described herein may comprise: providing an acidizing fluid comprising a stabilized microemulsion carrier fluid, a chelating agent, and a hydrofluoric acid source; introducing the acidizing fluid into a subterranean formation comprising a siliceous material; and at least partially dissolving the siliceous material in the subterranean formation with the acidizing fluid, thereby forming a spent fluid. In some embodiments, the siliceous material may comprise a silicate, an aluminosilicate, or any combination thereof.

In some embodiments, the methods may further comprise producing the spent fluid from the subterranean formation. In some embodiments, precipitates may be formed in the process of interacting the acidizing fluid with the subterranean formation. In some embodiments, methods described herein may further comprise forming a precipitate in the subterranean formation while at least partially dissolving the siliceous material, and producing the precipitate from the subterranean formation with the spent fluid.

In some embodiments, methods described herein may comprise: introducing a stabilized microemulsion carrier fluid, a chelating agent, and a hydrofluoric acid source to a subterranean formation comprising a siliceous material; at least partially dissolving a siliceous material in the subterranean formation with the hydrofluoric acid source; and complexing a metal ion in the subterranean formation with the chelating agent.

As described above, in some embodiments, the stabilized microemulsion carrier fluid, the chelating agent, and the hydrofluoric acid source may be combined in an acidizing fluid that is introduced to the subterranean formation. Although it may be desirable to include the stabilized microemulsion carrier fluid with the acidizing fluid in order to minimize the number of treatment stages, it is not necessary to do so. In some embodiments, the stabilized microemulsion carrier fluid may be introduced to the subterranean formation before the acidizing operation is carried out, that is, before the hydrofluoric acid source, the chelating agent, or both. Introduction of the stabilized microemulsion to the subterranean formation before acidization may be desirable to achieve better wetting of a surface within the subterranean formation. In other embodiments, the stabilized microemulsion carrier fluid may be introduced to the subterranean formation after the acidizing operation is carried out, that is, after the hydrofluoric acid source, the chelating agent, or both. Introduction of a stabilized microemulsion carrier fluid after acidization may be desirable to facilitate better wetting of precipitates that do form during the acidizing operation. Moreover, if the location of precipitates in the subterranean formation is rather localized, addition of the stabilized microemulsion carrier fluid as a spot treatment may allow the precipitates to be more efficiently produced from the subterranean formation with smaller volumes of the stabilized microemulsion carrier fluid than would otherwise be needed.

In some embodiments, the acidizing fluids described herein may further comprise a compound having two or more quaternized amine groups, as described in commonly owned U.S. patent application Ser. No. 13/588,158 entitled "Treatment Fluids Comprising a Stabilizing Compound Having Quaternized Amine Groups and Methods for Use Thereof," filed on Aug. 17, 2012 and now available as U.S. Patent Application Publication 2014/0048261, and incorporated herein by reference in its entirety. As described therein, such compounds may desirably decrease the incidence of precipitation during an acidizing process. In more particular embodiments, the compound having two or more quaternized amine groups may comprise a bis-quaternary ammonium compound. Illustrative bis-quaternary ammonium compounds that may be used in the treatment fluids described herein are further set forth in United States Patent Application Publications 2004/0235677 (now abandoned) and 2006/0013798, and U.S. Pat. No. 7,947,633, each of which is incorporated herein by reference in its entirety. One example of a bis-quaternary ammonium compound composition that can be suitable for use in the treatment fluids described herein is product BQA-6170 (produced by Corsitech, (Houston, Tex.) and commercially available through Halliburton Energy Services, Inc.), which is a mixture of bis-quaternary ammonium compounds.

In some embodiments, the acidizing fluids described herein may further comprise a silica scale control additive. As used herein, the term "silica scale control additive" will refer to any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Utilization of a silica scale control additive in combination with metal ion complexation provided by a chelating agent may beneficially permit a greater level of dissolved silicon to be realized than is possible through metal ion complexation alone. Suitable silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services, Inc.). Other suitable silica scale control additives may include ortho-dihydroxybenzene compounds, such as tannic acid, for example, as described in commonly owned United States Patent Application Publication 2012/0145401, which is incorporated herein by reference in its entirety.

In some embodiments, the acidizing fluids described herein may further comprise a silicate complexing agent, such as a functionalized pyridine compound, as described in commonly owned U.S. patent application Ser. No. 13/444,883, titled "Treatment Fluids Comprising a Silicate Complexing Agent and Methods for Use Thereof," filed on Apr. 12, 2012 and now available as U.S. Patent Application Publication 2013/0269936, and incorporated herein by reference in its entirety. Again, use of a silicate complexing agent may address one of the complex processes through which precipitation occurs during an acidizing operation.

In some embodiments, acidizing fluids described herein may further comprise an alkali metal complexing agent, such as a crown ether, azacrown ether, or pseudocrown ether, as described in commonly owned U.S. patent application Ser. No. 13/444,897, titled "Treatment Fluids Comprising an Alkali Metal Complexing Agent and Methods for Use Thereof," filed on Apr. 12, 2012 and now available as U.S. Patent Application Publication 20130269944, and incorporated herein by reference in its entirety. Use of such compounds may address precipitation effects that occur in the presence of alkali metal ions.

In further embodiments, the acidizing fluids described herein may further comprise any number of additives that are commonly used in treatment fluids including, for example, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a acidizing fluid of the present disclosure such that the acidizing fluid has properties suitable for a given application.

To facilitate a better understanding of the present invention, the following examples of preferred or representative embodiments are given. In no way should the following examples be read to limit, or to define, the scope of the invention.

EXAMPLES

Example 1

Flow Test in a Sandstone Core from the Bandera Outcrop

A treatment fluid having a pH of 2.5 and containing 0.6 M methylglycine diacetic acid (TRILON M commercially available from BASF), 1% HF by weight, 1% of a bis-quaternary ammonium compound by weight, and 0.5% of a stabilized microemulsion by weight was prepared and injected onto a sandstone core from the Bandera outcrop. The stabilized microemulsion was LOSURF 360 (commercially available from Halliburton Energy Services, Inc. of Houston, Tex.). The core composition is set forth in Table 1. The core sample's initial porosity was 14%.

Figure 2:
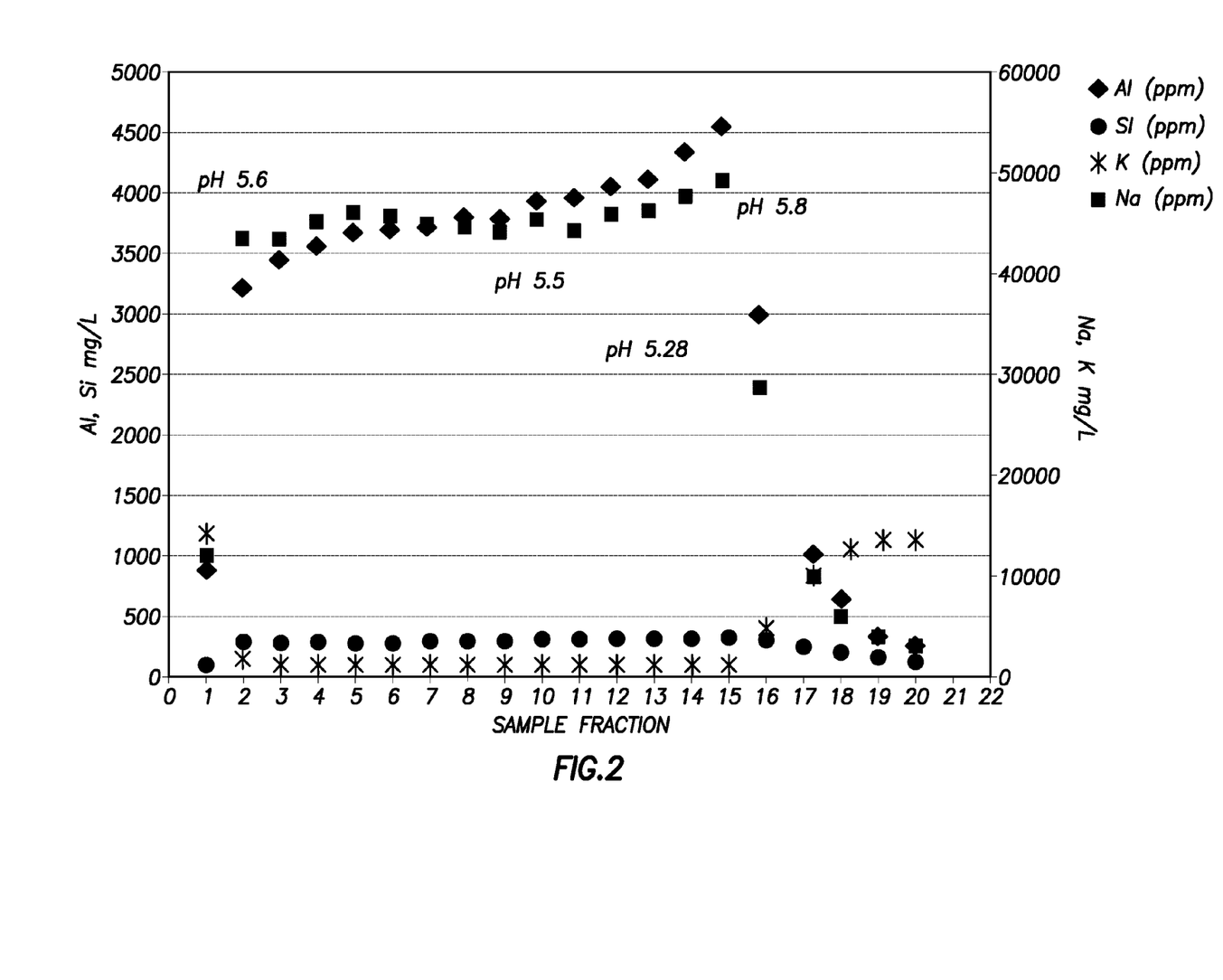
FIG. 2 shows a plot of concentration versus the sample fraction for the ionic constituents obtained during treatment of the core sample.

The treatment fluid was injected in a continuous fashion during the entire duration of the treatment phase, and 3% KCl brine was used for pre- and post-flushes. The temperature was held at 225° F. during the treatment phase, and 10 pore volumes of the treatment fluid were injected onto the core. The effluent pH ranged between 5.2 and 6.3. The effluent had ionic analyses within the following ranges: $Al^{3+}$ (3,500-4,500 mg/L), $Ca^{2+}$ (13,900-15,500 mg/L), $Mg^{2+}$ (4,600 mg/L) and $Fe^{3+}$ (9,300-10,900 mg/L). Further chemical analyses of the effluent are illustrated in FIG. 2.

TABLE 1

| Core Component | Percent Composition (%) |
| --- | --- |
| Quartz | 62 |
| Sodium feldspar | 14 |
| Calcite | 1 |
| Dolomite | 14 |
| Kaolinite | 4 |
| Illite/Mica | 5 |

Figure 1:
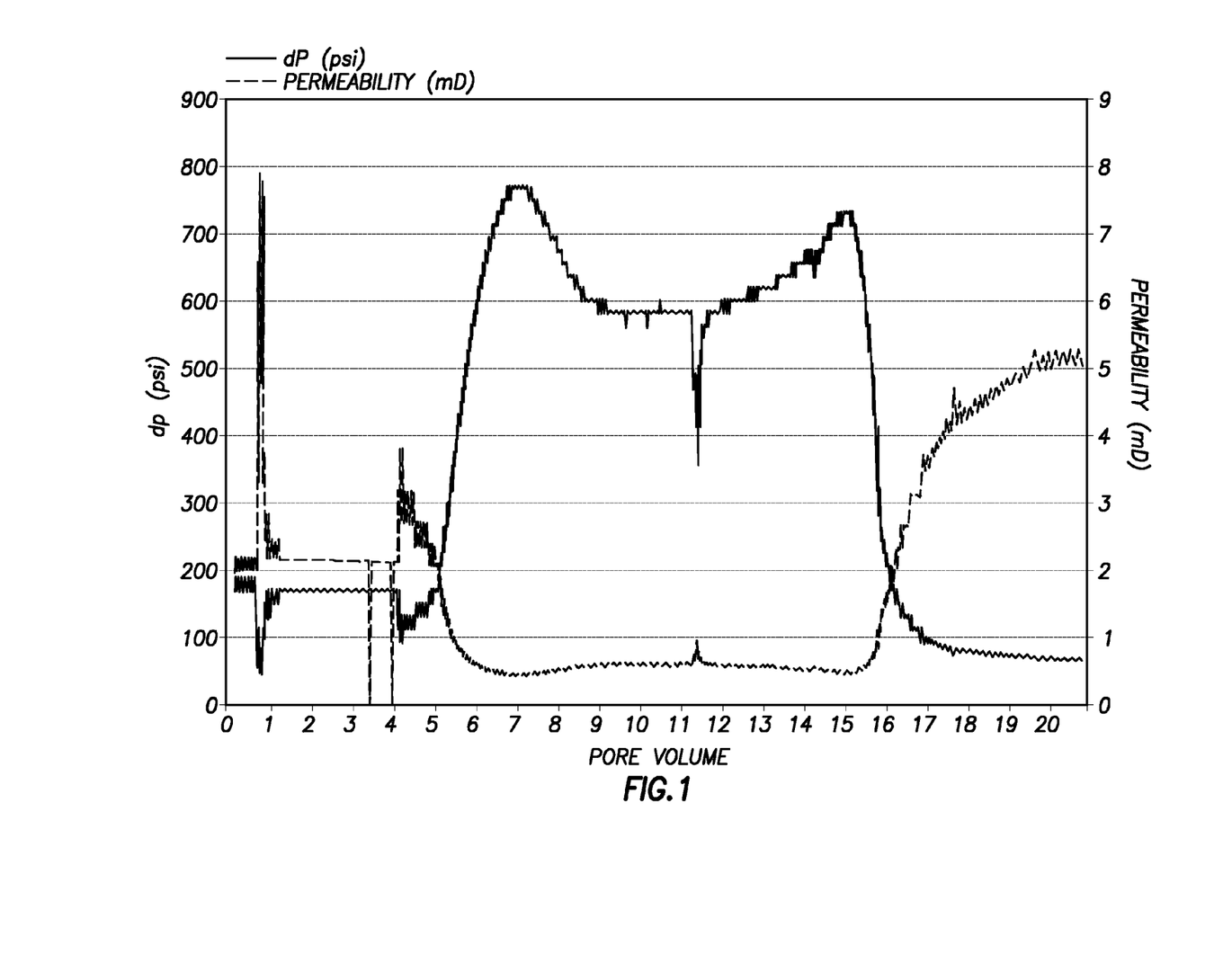
FIG. 1 shows a plot of differential pressure and permeability of the core sample as a function of time.

FIG. 1 shows a plot of differential pressure and permeability of the core sample as a function of time. As shown in FIG. 1, the permeability of the core sample increased considerably after the treatment stage was completed. The permeability increase was about 2.5-fold over the pretreatment permeability, and the differential pressure decreased to about one-third of its original value. FIG. 2 shows a plot of concentration versus the sample fraction for the ionic constituents obtained during treatment of the core sample. As shown in FIG. 2, high levels of aluminum and sodium were maintained during the treatment stage, indicating that these substances did not precipitate to any appreciable degree.

Embodiments disclosed herein include:

A. Methods of acidizing a subterranean formation. The methods involve providing an acidizing fluid comprising a stabilized microemulsion carrier fluid, a chelating agent, and an acid source; introducing the acidizing fluid into a subterranean formation; at least partially dissolving a surface in the subterranean formation with the acidizing fluid, thereby forming a spent fluid; and producing the spent fluid from the subterranean formation.

B. Methods of acidizing a subterranean formation. The methods involve providing an acidizing fluid comprising a stabilized microemulsion carrier fluid, a chelating agent, and a hydrofluoric acid source; introducing the acidizing fluid into a subterranean formation containing a siliceous material; and at least partially dissolving the siliceous material in the subterranean formation with the acidizing fluid, thereby forming a spent fluid.

C. Methods of complexing a metal ion in a subterranean formation. The methods involve introducing a stabilized microemulsion carrier fluid, a chelating agent, and a hydrofluoric acid source to a subterranean formation comprising a siliceous material; at least partially dissolving the siliceous material in the subterranean formation with the hydrofluoric acid source; and complexing a metal ion in the subterranean formation with the chelating agent.

Each of embodiments A, B and C may have one or more of the following additional elements in any combination:

Element 1: complexing a metal ion in the subterranean formation with the chelating agent.

Element 2: forming a precipitate in the subterranean formation while at least partially dissolving the surface in the subterranean formation, and producing the precipitate from the subterranean formation with the spent fluid.

Element 3: wherein the acid source comprises hydrofluoric acid or a hydrofluoric acid-generating compound.

Element 4: wherein the chelating agent, the stabilized microemulsion carrier fluid, or both are biodegradable.

Element 5: wherein the chelating agent comprises glutamic acid diacetic acid, methylglycine diacetic acid, or any combination thereof.

Element 6: wherein the acidizing fluid further comprises a compound having two or more quaternized amine groups.

Element 7: wherein the siliceous material comprises a silicate, an aluminosilicate, or any combination thereof.

Element 8: wherein the siliceous material further comprises about 1% to about 35% of a carbonate material by mass.

Element 9: producing the spent fluid from the subterranean formation.

Element 10: wherein the subterranean formation comprises a shale formation.

Element 11: wherein the stabilized microemulsion carrier fluid, the chelating agent, and the hydrofluoric acid source are combined in an acidizing fluid that is introduced to the subterranean formation.

Element 12: wherein the stabilized microemulsion carrier fluid is introduced to the subterranean formation before the chelating agent, the hydrofluoric acid source, or both.

Element 13: wherein the stabilized microemulsion carrier fluid is introduced to the subterranean formation after the chelating agent, the hydrofluoric acid source, or both.

Element 14: forming a precipitate in the subterranean formation while at least partially dissolving the siliceous material, and producing the precipitate from the subterranean formation with the spent fluid.

By way of non-limiting example, exemplary combinations applicable to A, B and C include:

Combination 1: The method of A, B or C in combination with Elements 2 and 3.

Combination 2: The method of A, B or C in combination with Elements 3 and 5.

Combination 3: The method of A, B or C in combination with Elements 1 and 7.

Combination 4: The method of A, B or C in combination with Elements 1 and 10.

Combination 5: The method of A, B or C in combination with Elements 3 and 11.

Combination 6: The method of A, B or C in combination with Elements 3 and 12.

Combination 7: The method of A, B or C in combination with Elements 3 and 13.

Combination 8: The method of A, B or C in combination with Elements 3 and 14.

Combination 9: The method of A, B or C in combination with Elements 3, 5 and 6.

Combination 10: The method of A, B or C in combination with Elements 3, 5 and 7.

Combination 11: The method of A, B or C in combination with Elements 3, 5 and 10.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing an acidizing fluid comprising an oil-in-water stabilized microemulsion carrier fluid having a continuous fluid phase and a discontinuous phase of emulsion particulates in the continuous fluid phase, a chelating agent, and an acid source;
wherein the acidizing fluid has a pH ranging between 0 and about 7;
introducing the acidizing fluid into a subterranean formation during an acidizing operation;
dissolving a matrix of the subterranean formation with the acidizing fluid during the acidizing operation, thereby forming a spent fluid; and
producing the spent fluid from the subterranean formation.

2. The method of claim 1, further comprising:
complexing a metal ion in the subterranean formation with the chelating agent.

3. The method of claim 1, further comprising:
forming a precipitate in the subterranean formation while dissolving the matrix of the subterranean formation; and
producing the precipitate from the subterranean formation with the spent fluid.

4. The method of claim 1, wherein the acid source comprises hydrofluoric acid or a hydrofluoric acid-generating compound.

5. The method of claim 1, wherein the chelating agent, the oil-in-water stabilized microemulsion carrier fluid, or both are biodegradable.

6. The method of claim 1, wherein the chelating agent comprises glutamic acid diacetic acid, methylglycine diacetic acid, or any combination thereof.

7. The method of claim 1, wherein the acidizing fluid further comprises a compound having two or more quaternized amine groups.

8. A method comprising:
providing an acidizing fluid comprising an oil-in-water stabilized microemulsion carrier fluid having a continuous fluid phase and a discontinuous phase of emulsion particulates in the continuous fluid phase, a chelating agent, and a hydrofluoric acid source;
wherein the acidizing fluid has a pH ranging between 0 and about 7;
introducing the acidizing fluid into a subterranean formation during an acidizing operation, the subterranean formation having a matrix comprising a siliceous material; and
dissolving the matrix of the subterranean formation with the acidizing fluid during the acidizing operation, thereby forming a spent fluid.

9. The method of claim 8, wherein the siliceous material comprises a silicate, an aluminosilicate, or any combination thereof.

10. The method of claim 8, further comprising:
complexing a metal ion in the subterranean formation with the chelating agent.

11. The method of claim 8, further comprising:
producing the spent fluid from the subterranean formation.

12. The method of claim 11, further comprising:
forming a precipitate in the subterranean formation while dissolving the matrix of the subterranean formation; and
producing the precipitate from the subterranean formation with the spent fluid.

13. The method of claim 8, wherein the hydrofluoric acid source comprises hydrofluoric acid or a hydrofluoric acid-generating compound.

14. The method of claim 8, wherein the siliceous material further comprises about 1% to about 35% of a carbonate material by mass.

15. The method of claim 8, wherein the acidizing fluid further comprises a compound having two or more quaternized amine groups.

16. The method of claim 8, wherein the subterranean formation comprises a shale formation.

17. A method comprising:
introducing an oil-in-water stabilized microemulsion carrier fluid having a continuous fluid phase and a discontinuous phase of emulsion particulates in the continuous fluid phase, a chelating agent, and a hydrofluoric acid source to a subterranean formation during an acidizing operation, the subterranean formation having a matrix comprising a siliceous material;
wherein the oil-in-water stabilized microemulsion carrier fluid has a pH ranging between 0 and about 7;
dissolving the matrix of the subterranean formation with the hydrofluoric acid source during the acidizing operation; and
complexing a metal ion in the subterranean formation with the chelating agent.

18. The method of claim 17, wherein the oil-in-water stabilized microemulsion carrier fluid, the chelating agent, and the hydrofluoric acid source are combined in an acidizing fluid that is introduced to the subterranean formation.

19. The method of claim 17, wherein the oil-in-water stabilized microemulsion carrier fluid is introduced to the subterranean formation before the chelating agent, the hydrofluoric acid source, or both.

20. The method of claim 17, wherein the oil-in-water stabilized microemulsion carrier fluid is introduced to the subterranean formation after the chelating agent, the hydrofluoric acid source, or both.

21. The method of claim 17, further comprising:
forming a precipitate in the subterranean formation while dissolving the matrix of the subterranean formation; and
producing the precipitate from the subterranean formation.

* * * * *